Feb. 12, 1963 MITSURU NAKAYAMA 3,077,237
LANDING NET WITH WEIGHING AND MEASURING COMBINATION
Filed June 28, 1960 2 Sheets-Sheet 1

INVENTOR.
MITSURU NAKAYAMA
BY Walter S. Oleston
ATTORNEY

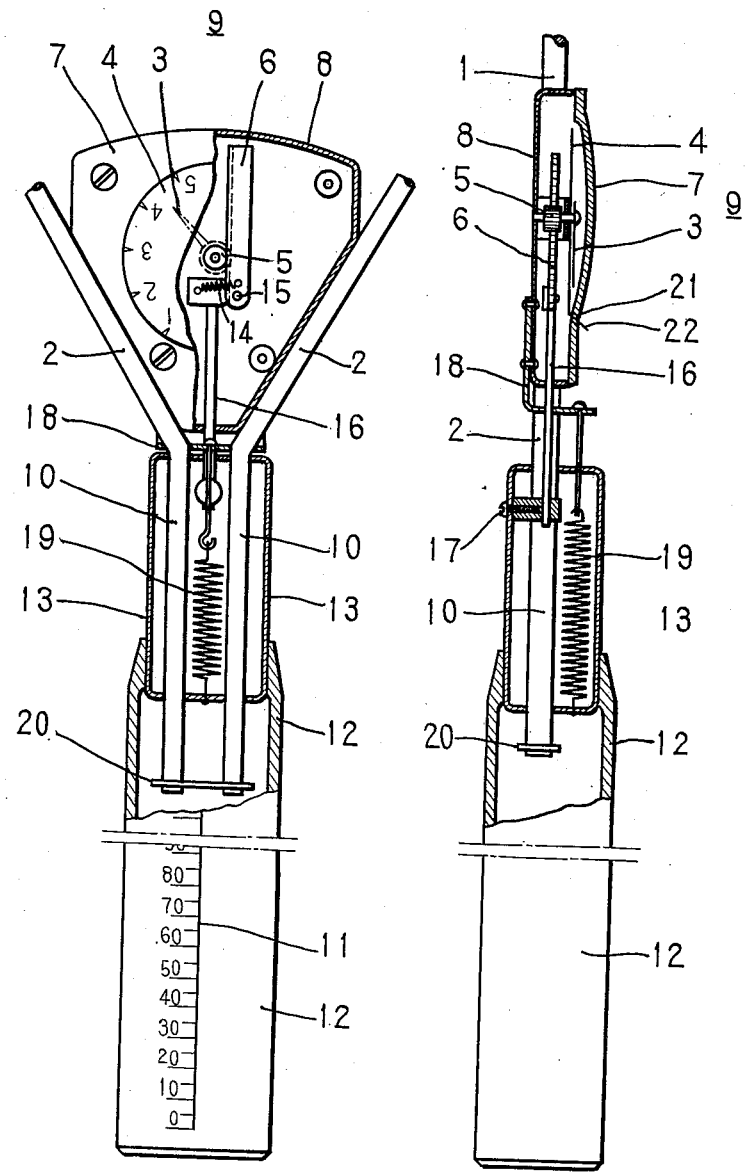

3,077,237
LANDING NET WITH WEIGHING AND MEASURING COMBINATION

Mitsuru Nakayama, 2613 O-Aza Tatebayashi, Tatebayashi City, Japan
Filed June 28, 1960, Ser. No. 39,344
4 Claims. (Cl. 177—245)

This invention relates to nets for landing fish and the like, and more particularly to a landing net equipped with a weighing and measuring combination.

It is usual to scoop a caught fish from the water with a spoon-net. It is frequently desired to measure its length and weight immediately.

The principal object of this invention is to provide a spoon-net capable of measuring the length and weight of a catch at almost the same time. In one of its aspects, the invention provides a fish landing net consisting essentially of an elongated handle carrying a casing on a longitudinal end portion thereof, and a net mounted on the casing and movable longitudinally of the handle under the weight of a caught fish against the restraint of a spring. The net includes a substantially rigid elongated frame member the two end portions of which are slidably received in the casing. A central portion of the frame member outside the casing arcuately connects the two end portions and flares in a direction away from the casing so as to define a corner adjacent the end portions. A dial is rotatable about a fixed axis on a housing mounted on the frame member in the corner. A pointer connected with a pinion for joint movement is rotatable in the housing about the dial axis. A rack meshes with the pinion and is releasably secured to the handle. The aforementioned spring is contained in the casing. Two spaced portions of the spring are secured to the handle and to the housing so that the spring tends to urge movement of the housing toward the casing. Measuring indicia are uniformly spaced along a straight longitudinal line on the handle.

Other features and many of the attendant advantages of this invention will be readily appreciated as the same becomes better understood by reference to the following detailed description of a preferred embodiment when considered in connection with the accompanying drawing wherein:

FIGURE 3 is an enlarged front view of a detail of the net of FIG. 1 with outer elements partly broken away to reveal internal working elements; and FIGURE 4 is a side view, partly in section of the device of FIG. 3.

Figures 1, 2:
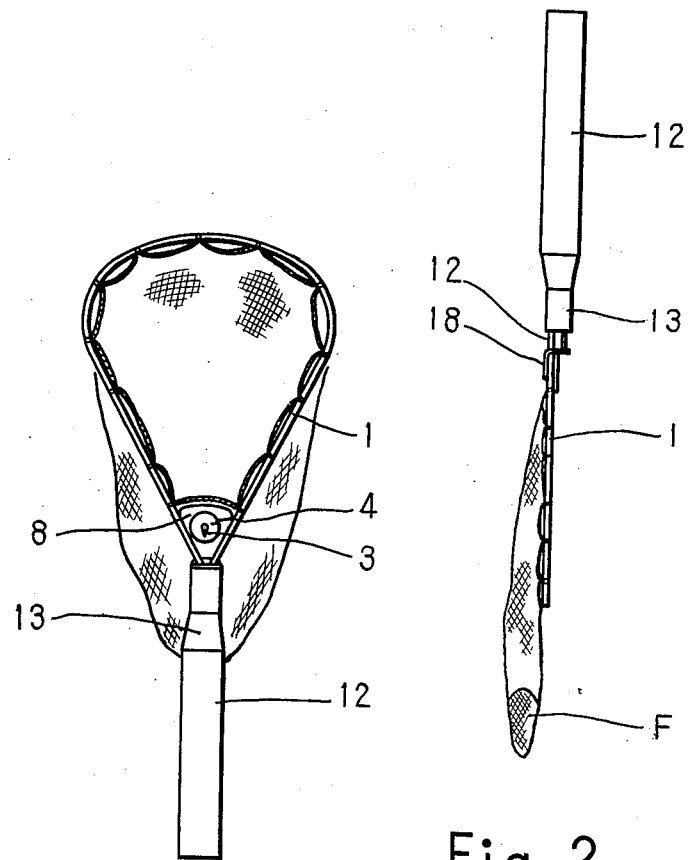
FIGURE 1 is a front view of a spoon-net of the invention.
FIGURE 2 is a side view of the spoon-net of FIG. 1.

The illustrated spoon-net includes a net 1 mounted on a handle 12. The net includes a frame having a center portion 2 which is arcuately shaped. A scale 9 is supported in a scale housing 8 mounted on the net frame and arranged in a corner defined by the central frame portion 2 near the handle 12. The working elements of the scale 9 includes a dial 4 rotatable in the housing 8 about a fixed axis, a pinion 5 and a pointer 3 jointly rotatable about that axis, and a rack 6 meshing with the pinion 5. The dial 4 and pointer 3 are visible from the outside through a transparent cover 7 of the housing 8. The net 1 with the scale 9 mounted thereon is secured to a casing 13 which is fixedly attached to an end of the handle 12. The end portions 10 of the net frame are slidable in the casing 13 in the direction of elongation of the handle. The handle carries outer indicia 11 which jointly constitute a length scale.

One end of a rod 16 is connected to the rack 6 by a pivot pin 15. The other end of the rod 16 projects from the scale housing 8 into the casing 13 and is fastened internally to the casing by a screw 17. The rack 6 is urged into engagement with the pinion 5 by a spring 14.

A helical spring 19 in the casing 13 has an end portion fastened to the casing 13. The other end portion of the spring 19 is releasably attached to the scale housing 8 by means of a bracket 18. The free end portions 10 of the net frame extend through corresponding apertures in the casing 12 into the hollow handle 12, and are linked within the handle by a bar 20 which limits movement of the net frame outward of the handle 12.

A slot 21 in the transparent cover 7 permits outward passage of a tongue 22 attached to the dial 4. The dial may be rotated manually by means of the tongue 22 to adjust the zero point of the scale 9 for water absorbed by the net 1.

The apparatus illustrated in the drawing is operated as follows:

An angler having caught a fish F and landing it in the spoon-net, holds the net as shown in FIGURE 2 so that the net frame is pulled out of the handle 12 by the weight of the fish against the restraint of the spring 19. The pointer 3 is rotated by the rack 6 to indicate the weight of the fish caught on the dial 4.

To compensate for absorption of water, the net is dipped into the water prior to use, and the zero point of the dial 4 is adjusted by means of the tongue 22. The length of the fish is measured on the scale formed by the indicia 11 on the handle.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

What I claim is:

1. A fish landing net comprising an elongated handle; a casing mounted on a longitudinal end portion of said handle; a net member including a substantially rigid elongated frame member having two end portions slidably received in said casing for reciprocating movement in respective paths extending in the direction of elongation of said handle, and a central portion outside said casing and arcuately connecting the end portions of said frame member, said central portion flaring in a direction away from said casing so as to define a corner adjacent said end portions; a housing mounted on said frame member in said corner; a dial mounted in said housing and having an axis fixed on said housing; means for rotating said dial about said fixed axis; a pointer rotatable in said housing about said axis; pinion means connected to said pointer for joint movement therewith in said housing; rack means meshing with said pinion means; motion transmitting means releasably secured to said longitudinal end portion of said handle and secured to said rack means for moving said rack means responsive to relative movement of said housing and said handle; spring means having two spaced portions respectively secured to said housing and to said end portion of said handle, at least a portion of said spring means being contained in said casing, said spring means urging movement of said housing in a direction toward said casing; and a plurality of indicia uniformly spaced along a straight longitudinal line on said handle.

2. A fish landing net comprising an elongated handle; a net member mounted on said handle and reciprocably slidable thereon toward and away from a predetermined position; spring means secured to said handle and to said net for resiliently resisting urging movement of said net member in a direction toward said position; indicating means on said net member for indicating the spacing of said net member from said position thereof; a plurality of uniformly spaced indicia arranged along a straight line on said handle, said indicating means including a dial mounted on said net member and having a fixed axis; a pointer rotatable about said axis; pinion means connected to said pointer for joint movement therewith; rack means meshing with said pinion means; and motion transmitting means secured to said handle and to said rack means for actuating rotation of said pointer about said axis when said net member moves relative to said handle; said net member including a substantially rigid elongated frame member having two end portions slidable in said handle in substantially parallel paths, and an arcuate elongated central portion flaring in a direction away from said end portions so as to define a corner adjacent said end portions; and a housing mounted on said frame member in said corner, said dial, pointer, rack means, and a portion of said motion transmitting means being mounted in said housing, said spring means having two spaced portions respectively secured to said housing and said handle.

3. A net as set forth in claim 2, further including means for rotating said dial about said axis.

4. A net as set forth in claim 2, wherein said handle includes a casing constituting a longitudinal end portion of said handle, said net member is mounted on said handle for longitudinally reciprocal slidable movement of a portion thereof in said casing, and said spring means is at least partly mounted in said casing.

References Cited in the file of this patent
UNITED STATES PATENTS

| | | |
|---|---|---|
| 636,920 | McKieman | Nov. 14, 1899 |
| 1,255,269 | Zinkiewiez | Feb. 5, 1918 |
| 2,129,469 | Hedges | Sept. 6, 1938 |
| 2,633,351 | Fowle | Mar. 31, 1953 |
| 2,750,184 | Warndahl | June 12, 1956 |